United States Patent
Testa

(10) Patent No.: US 10,682,838 B2
(45) Date of Patent: Jun. 16, 2020

(54) MANUFACTURING PROCESS OF A LAMINATED POLYMERIC PRODUCT

(71) Applicant: Elisabetta Testa, Varese (IT)

(72) Inventor: Elisabetta Testa, Varese (IT)

(*) Notice: Subject to any disclaimer, the term of this patent is extended or adjusted under 35 U.S.C. 154(b) by 62 days.

(21) Appl. No.: 15/571,621

(22) PCT Filed: May 5, 2016

(86) PCT No.: PCT/IB2016/052557
§ 371 (c)(1),
(2) Date: Nov. 3, 2017

(87) PCT Pub. No.: WO2016/178169
PCT Pub. Date: Nov. 10, 2016

(65) Prior Publication Data
US 2018/0086040 A1 Mar. 29, 2018

(30) Foreign Application Priority Data

May 5, 2015 (IT) .................. 102015902348159

(51) Int. Cl.
*B32B 37/06* (2006.01)
*B32B 3/30* (2006.01)
(Continued)

(52) U.S. Cl.
CPC ................ *B32B 37/06* (2013.01); *B32B 3/30* (2013.01); *B32B 7/02* (2013.01); *B32B 7/12* (2013.01);
(Continued)

(58) Field of Classification Search
CPC .......... B32B 37/06; B32B 38/14; B32B 7/02; B32B 7/12; B32B 23/08; B32B 27/08;
(Continued)

(56) References Cited

U.S. PATENT DOCUMENTS

2004/0126587 A1* 7/2004 Maki ................. B29D 11/0073
428/412
2015/0219921 A1 8/2015 Zhang et al.

FOREIGN PATENT DOCUMENTS

CN 103 624 978 A 3/2014
WO 2014/029192 A1 2/2014

OTHER PUBLICATIONS

International Search Report, dated Aug. 31, 2016, from corresponding PCT/IB2016/052557 application.

* cited by examiner

*Primary Examiner* — William K Cheung
(74) *Attorney, Agent, or Firm* — Young & Thompson

(57) ABSTRACT

A manufacturing process of, and the relative laminated, polymeric semi-finished product are disclosed, the laminated, polymeric semi-finished product having in-depth aesthetic features, including at least two mutually welded layers by a lamination process with heat and/or pressure addition, wherein at least one of the layers is a thermoplastic material, in which the following steps are provided: providing a cohesion layer 100-500 micron thick, consisting of thermoplastic polyurethane, featuring in-depth aesthetic patterns; providing polymeric sheets with materials having a softening temperature above the one of the cohesion layer; and laminating at least one of the polymeric sheets at least partly transparent or translucent with the cohesion layer, by heat and/or pressure addition suitable to reach the softening of the cohesion layer featuring aesthetic patterns.

8 Claims, 2 Drawing Sheets

(51) Int. Cl.
    *B32B 7/02*    (2019.01)
    *B32B 7/12*    (2006.01)
    *B32B 23/08*    (2006.01)
    *B32B 27/08*    (2006.01)
    *B32B 27/32*    (2006.01)
    *B32B 27/34*    (2006.01)
    *B32B 27/40*    (2006.01)
    *B32B 37/10*    (2006.01)
    *B32B 38/14*    (2006.01)
    *B44C 3/02*    (2006.01)
    *B29C 65/02*    (2006.01)
    *B29C 65/04*    (2006.01)
    *B29C 65/06*    (2006.01)
    *B29C 65/08*    (2006.01)
    *B29C 65/48*    (2006.01)
    *G02C 5/00*    (2006.01)
    *B32B 27/36*    (2006.01)
    *B32B 27/28*    (2006.01)
    *B32B 27/30*    (2006.01)
    *B29C 65/00*    (2006.01)
    *B32B 38/00*    (2006.01)
    *B29C 65/50*    (2006.01)

(52) U.S. Cl.
    CPC ............. *B32B 23/08* (2013.01); *B32B 27/08* (2013.01); *B32B 27/281* (2013.01); *B32B 27/285* (2013.01); *B32B 27/302* (2013.01); *B32B 27/304* (2013.01); *B32B 27/308* (2013.01); *B32B 27/32* (2013.01); *B32B 27/34* (2013.01); *B32B 27/365* (2013.01); *B32B 27/40* (2013.01); *B32B 37/10* (2013.01); *B32B 38/14* (2013.01); *B44C 3/02* (2013.01); *G02C 5/008* (2013.01); *B29C 65/02* (2013.01); *B29C 65/04* (2013.01); *B29C 65/06* (2013.01); *B29C 65/08* (2013.01); *B29C 65/48* (2013.01); *B29C 65/4815* (2013.01); *B29C 65/5057* (2013.01); *B29C 66/1122* (2013.01); *B29C 66/45* (2013.01); *B29C 66/71* (2013.01); *B29C 66/712* (2013.01); *B29C 66/7352* (2013.01); *B32B 38/145* (2013.01); *B32B 2270/00* (2013.01); *B32B 2274/00* (2013.01); *B32B 2307/404* (2013.01); *B32B 2307/4026* (2013.01); *B32B 2307/412* (2013.01); *B32B 2307/414* (2013.01); *B32B 2307/536* (2013.01); *B32B 2307/546* (2013.01); *B32B 2307/554* (2013.01); *B32B 2307/732* (2013.01); *B32B 2309/02* (2013.01); *B32B 2309/12* (2013.01); *B32B 2317/18* (2013.01); *B32B 2375/00* (2013.01); *B32B 2377/00* (2013.01); *B32B 2451/00* (2013.01); *B32B 2457/00* (2013.01); *B32B 2551/00* (2013.01); *G02C 2200/14* (2013.01)

(58) Field of Classification Search
    CPC ... B32B 27/281; B32B 27/285; B32B 27/302; B32B 27/304; B32B 27/308; B32B 27/32; B32B 27/34; B32B 27/365; B32B 27/40; B32B 3/30; B32B 37/10; B32B 38/145; B32B 2307/412; B32B 2307/414; B32B 2307/554; B32B 2309/02; B32B 2309/12; B32B 2317/18; B32B 2457/00; B32B 2551/00
    USPC ......................................................... 428/411
    See application file for complete search history.

MANUFACTURING PROCESS OF A LAMINATED POLYMERIC PRODUCT

This application is a national stage entry under 35 U.S.C. § 371 from PCT international application PCT/IB2016/052557, filed May 5, 2016, which claims the benefit of Italy patent application 102015902348159, filed May 5, 2015, the entire contents of which are hereby incorporated by reference as if fully set forth herein.

FIELD OF INVENTION

The present invention relates to a manufacturing process of a product in the form of a sheet or other semi-finished product, consisting of a layered thermoplastic material, as well as to a relative frame for glasses.

BRACKGROUND ART

As known, in the eyewear field plastic material are widely used, namely for manufacturing eyewear frames, i.e. the part supporting the pair of lens.

Historically the frames were obtained by processing of metal wires or naturally derived and animal material, such as horn, bone and tortoise shell. With the advent of cellulose nitrate (celluloid), the materials of natural and animal origin were gradually replaced or increasingly used together with celluloid based products, i.e., a plasticized thermoplastic polymer suitable to replicate similar aesthetic effects to the natural ones. Since the twenties of the '900 the celluloid was slowly replaced by its analogue made of cellulose acetate, the latter having a higher thermal stability. The plasticized cellulose acetate, processed by different techniques such as block process, extrusion process and lamination process, has become the polymer more widely used in premium eyewear, due to its physical and mechanical performance suitable for the specific use, but also to more sensory features such as the warm and silky hand, and the important aesthetic qualification. The eyeglasses, whether ophthalmic glasses or sunglasses, are in fact more and more considered as fashion accessories, rather than only corrective or protective instruments.

Over the years, the eyeglasses obtained by milling sheets of cellulose esters, among which the cellulose acetate is the most representative, were flanked by eyeglasses obtained by injection moulding or by casting techniques of various polymers, in the most cases thermoplastic polymers, including polyamide, cellulose propionate, polyurethane, polyesters and co-polyesters, naturally-derived polymers, such as polylactic acid (PLA) and poly-hydroxy-alkanoates (PHA), and others.

Each of the above products is selected according to the needs required by the finished product: some polymers are selected according to their technical performance (strength, stability, hardness, light weight, and so on), while others mainly in view of their aesthetic qualities. In reality, a trade-off choice is always made, because the more plastics having high technical performance are used (e.g., the particularly clingy sports eyewear, or eyeglasses having as a requirement the thinness of the profiles), the less likely their fine aesthetic quality becomes.

The market is, however, more and more oriented to the aesthetic qualification of the finished product and to the differentiation driven by the aesthetic effects: eventually, the producers satisfy their customers even at the cost of conceiving collections with short runs.

The eyeglasses that best meet these requirements are those obtained from sheets formed by block process (both wet-block and dry block processes), extruding process and laminating process, which can however be used with materials that, in certain applications, pose a limit on the technical performance; peculiarity of these materials is that they can incorporate very complex and heterogeneous patterns, even in depth, thereby providing a long lasting aesthetic and very characteristic appearance. Conversely, the frames obtained by the injection moulding or casting process, which can also be used with materials with higher technical performance, are less aesthetically fine (because the material is necessarily homogeneous) and are subject to surface finishing treatments such as spraying, printing, or various surface colour coating processes, which, however, are not able to ensure the same variety of aesthetic patterns and also in depth aesthetic pattern. The surface finishings, such as those described above, are most subject to wear: the limited thickness of these treatments is in fact exposed to substances that can accelerate their removal (e.g., sweat, sunscreen and cosmetic creams), and with dynamics that can scratch the surface resulting in the exposing of the polymer layer in its original aspect (before the finishing treatment), thus causing the product to lose the aesthetic qualities.

As can be seen, it is not possible today to provide eyeglasses, at affordable prices, which can meet the requirements of the market, i.e., both the aesthetic quality and the mechanical requirements.

The same applies to other application sectors different from the eyewear field (for example, costume jewelery, consumer electronics, other technical articles . . . ), in which it would be advantageous to have technically effective materials with high-quality aesthetic effects that make also noble their technical function.

It would therefore be desirable to provide a process for obtaining sheets, eyeglass blanks, eyeglasses or parts thereof, which have high aesthetic features along with mechanical performance suitable to the more technical uses, in addition to having a product that does not deteriorate due to wear.

A possible solution, already given at least at the conceptual level, is to produce a sheet, or a semi-finished product, by laminating together several layers of materials with complementary features, wherein at least one of the layers has valuable aesthetic qualities: for example, a polycarbonate layer (technical material) coupled to a thin sheet of cellulose acetate produced by a block process (aesthetic material).

This technique provides the mutual hot welding of the various layers (for example an ultrasonic welding), or the moulding of the same on one another, or even the bonding of the same by means of an adhesive (for example, the so-called hot-melt polymeric glues). However, again, the using of materials of high aesthetic value, such as cellulose acetate, suffers from the problem of having poor technical performance, thereby the laminate has as a result a high thickness to ensure adequate mechanical characteristics. Additionally, some of these materials (such as cellulose acetate) have inherent bonding problems when they are coupled with different materials.

An example of these coupling techniques, which, however, suffers from the problems mentioned above, is represented by CN103624978, also published as WO2014029192.

A generic laminating technique, used for polycarbonate lenses, which also employs a polyurethane layer, is described in US2004/0126587. In this case, the layer of thermoplastic or thermosetting polyurethane material includes uniformly dispersed photochromic pigments, to provide a slight (because it must remain substantially transparent) photochromic colouring. The polyurethane layer is preferably obtained by casting or injection—and possibly adhesive bonded to adjacent layers—because it still needs to be evenly distributed in front of the visual field. In this case, both materials have a technical function.

SUMMARY OF THE INVENTION

The problem addressed by the invention is therefore to provide a manufacturing process of a sheet or a semi-finished product for eyeglass frames, which overcomes the drawbacks of the prior art. In particular, the present invention aims to provide a product having both high chemical and physical-mechanical performance and important aesthetic value, being able to have reduced thicknesses and costs.

These objects are achieved by the process and the product therefrom as defined, in their essential terms, in the appended independent claims.

Other inventive aspects of the invention are described in the dependent claims.

Indeed, according to a first aspect of the invention, a manufacturing process of a layered, polymeric semi-finished product is provided, said product having in-depth aesthetic features and comprising at least two mutually bonded layers by a lamination process with heat and/or pressure addition, wherein at least one of said layers is a thermoplastic material, in which the following steps are provided:

providing a cohesion layer 100-500 micron thick, consisting of thermoplastic polyurethane, featuring in-depth aesthetic patterns, which extend in depth, obtained by a co-extrusion or block process, providing polymeric sheets with materials having a softening temperature above the one of said cohesion layer, laminating at least one of said polymeric sheets at least partly transparent or translucent with said cohesion layer, by temperature and/or pressure addition suitable to reach the softening of said cohesion layer featuring aesthetic patterns.

According to a further aspect, the polymeric sheets are based on one of the polymeric materials of the group consisting of polyamide (PA), polyurethane (PU), polyethereimides (PEI), cellulose propionate (CP), polyurethane-polyurea, thermosetting polyurethane, polycarbonate (PC), polymethil metacrylate (PMMA), acrylonitryl butadien styrene (ABS), polyethylene (PE), styrene-acrylonitryl (SAN), acrylonitryl-styrene-acrylate (ASA), mixtures of polycarbonate and acrylonitryl butadien styrene (PC/ABS), PVC, polybutylenteraphtalate (PBT), PBT/ASA, ASA/PC.

According to another second aspect, the invention provides a layered semi-finished polymeric product, provided with in-depth aesthetic patterns, comprising at least two mutually bonded layers by a lamination process with heat and/or pressure addition, wherein at least one cohesion layer with one or more polymeric sheets consists of thermoplastic polyurethane featuring in-depth aesthetic patterns having a softening temperature below that of said polymeric sheets and at least one of said polymeric sheets in contact with the cohesion layer is at least partly transparent or translucent.

Similarly to what mentioned above, the polymeric sheets are based on one of the polymeric materials of the group consisting of polyamide (PA), polyurethane (PU), polyethereimides (PEI), cellulose propionate (CP), polyurethane-polyurea, thermosetting polyurethane, polycarbonate (PC), polymethil metacrylate (PMMA), acrylonitryl butadien styrene (ABS), polyethylene (PE), styrene-acrylonitryl (SAN), acrylonitryl-styrene-acrylate (ASA), mixtures of polycarbonate and acrylonitryl butadien styrene (PC/ABS), PVC, polybutylenteraphtalate (PBT), PBT/ASA, ASA/PC.

The aesthetic effects on the thermoplastic polyurethane interlayer are obtained through one of the techniques of block processes or co-extrusion processes.

It is also provided an original frame for glasses obtained with a product as described above.

According to another aspect, the invention provides a eyeglass blank, a pair of eyeglasses or parts thereof, resulting from the processing of a sheet composed of a plurality of layers of thermoplastic polymers, of which at least an inner thermoplastic polyurethane-based interlayer acting as a welding element of the laminate. On the other hand, the invention also relates to a process to obtain a eyeglass blank, a pair of glasses or parts thereof, resulting from a sheet composed of different layers of thermoplastic polymers, of which at least one is composed of a thermoplastic polyurethane foil, said polyurethane foil acting as a welding element of the laminate, and, at the same time, giving the aesthetic quality to the laminate. The aesthetic feature of the polyurethane can be obtained preferably by means of a block process. The featuring with in-depth aesthetic patterns can also be achieved by co-extrusion process, co-moulding process, and also by printing processes such as screen printing, thermal transfer printing or digital printing, or any process that gives in-depth colouring and patterns to the sheet. Said sheet may contain one or a plurality of colours, whether chosen from transparent, opal, opaque, pearly or migrant colours. The sheet so composed, in addition to the eyewear field, can be used for all those fields where the aesthetic component is important, such as costume jewellery, dishes, trays, coverings (cases, packages, personal computer cases, . . . ), coatings (furniture, flooring, lighting, car interiors or yachting, musical instruments, sporting articles, . . . ), and other technical articles.

BRIEF DESCRIPTION OF DRAWINGS

Further characteristics and advantages of the process and the product according to the invention will become more apparent from the following detailed description of preferred embodiments thereof, given by way of example and illustrated on the accompanying drawings, in which.

DETAILED DESCRIPTION OF PREFERRED EMBODIMENTS

Figure 1:
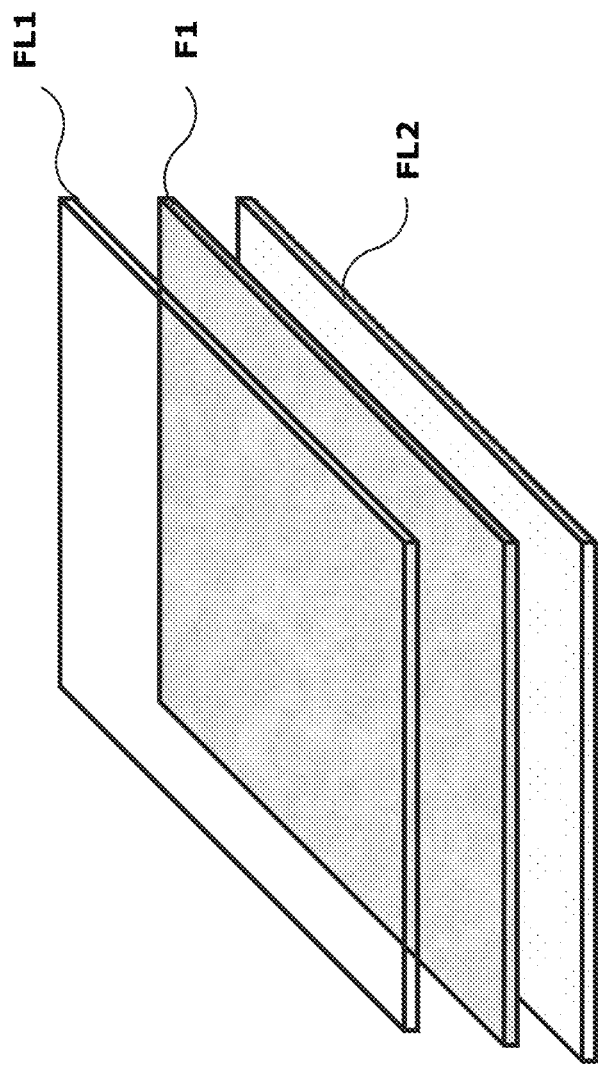
FIG. 1 is a schematic perspective view of an exemplary laminate composed of an intermediate layer of thermoplastic polyurethane and two transparent outer layers.

A sheet of plastic material is produced, in a per se known manner, by means of a lamination of several planar layers of different materials. By lamination, in the context of the present application, is meant any process suitable to bond a plurality of layers formed by individual foils of plastic material, which can be different or the same, but different in terms of technical performance or aesthetic appearance.

In the following it will be described some preferred methods for obtaining the lamination, but generally said methods make use of heat and pressure addition to melt one or more of the component layers, in order to obtain an intimate adherence or even a chemical bond with the adjacent layers, and to produce a stable sheet in which the individual layers are permanently bonded to each other, while avoiding—at least in normal operating conditions—a delamination between the various layers.

According to the invention, at least one of these intermediate layers F1 is a thermoplastic polyurethane-based semifinished product, which has been conferred an aesthetic value with an in-depth pattern, using one of viable processes on a thermoplastic material, which is preferably block processing, co-extrusion and co-injection, that allow to define aesthetic patterns in deep into the material, thus giving a durable and very much appreciated aesthetic featuring to the material.

This intermediate layer F1 of thermoplastic polyurethane (TPU) is produced with one of the methods just described, possibly applying aesthetic featuring through an overprint, and then allowing it to cool and possibly storing it. The thickness of this layer is preferably between 100 and 500 microns.

According to the invention, it constitutes a support for an aesthetic pattern and, at the same time, an effective binder element for the lamination process, taking advantage of the inherent qualities of thermoplastic polyurethanes, which—due to the chemical properties and to the relatively low melting point (between 80 and 220° C.)—are able to effectively act as bonding agent for a plurality of different plastic polymeric materials. Therefore, according to the invention, this thermoplastic polyurethane layer having aesthetic features is going to constitute a reference element for the lamination with other layers of different materials, which are then selected only by virtue of their technical performance, as long as they have a sufficient transparency (on the whole area of the semi-finished product or on its own suitably selected portion) to allow the external exploitation of the aesthetic features of the interlayer of thermoplastic polyurethane.

The laminating process according to the invention provides then to couple the plastic polyurethane layer having aesthetic features with a sheet of other technical plastic material, or between two films/sheets of semi-finished plastic material FL1 and FL2 (FL1 refers to the upper top sheet of the package and FL2 refers to the lower base sheet of the package), each with a thickness preferably comprised between 500 microns and 1 cm.

If the thermoplastic polyurethane layer F1 is particularly thin, for example about 100 microns, it can be supplied temporary coupled to a release paper: in this case, one can expect a light laminating step of the layer F1 on a first sheet FL1, before removing the release paper, and subsequently a second step of laminating with the other sheet FL2.

The plastic sheets FL1 and FL2—that can be laminated by means of the interposition of the intermediate TPU layer having aesthetic features—are preferably selected from the group consisting of polymers such as polyamide (PA), polyurethane (PU), polyethereimides (PEI), cellulose propionate (CP), polyurethane-polyurea, thermosetting polyurethane, polycarbonate (PC), polymethil metacrylate (PMMA), acrylonitryl butadien styrene (ABS), polyethylene (PE), styrene-acrylonitryl (SAN), acrylonitryl-styrene-acrylate (ASA), mixtures of polycarbonate and acrylonitryl butadien styrene (PC/ABS), PVC, polybutylenteraphtalate (PBT), PBT/ASA, ASA/PC.

It is also known that a plasma treatment, applied on the surface of certain polymers being in contact with the thermoplastic polyurethane sheet, can improve the adhesion: for example, advantageous results are obtained with some polyamides (Polyamide 6.6), PBT, PS, PP.

The two plastic sheets FL1 and FL2, opposing and adhering to the intermediate layer of laminated TPU having aesthetic features, can be formed from the same polymer or from two different polymers (for example, a cellulose propionate sheet and a polyamide sheet). Based on the final application of the product or of the structure to be obtained (for example, the frame for glasses), at least one of the two sheets FL1 or FL2 must have at least a transparency or translucency feature—possibly on a geometrically defined portion thereof—for making evident the aesthetic pattern of the underlying intermediate layer of TPU; in some cases, to improve and make more evident the aesthetic connotation of the layer F1 of TPU, both the sheets FL1 and FL2 have characteristics, optionally at least partial, of transparency/translucency.

Figure 3:
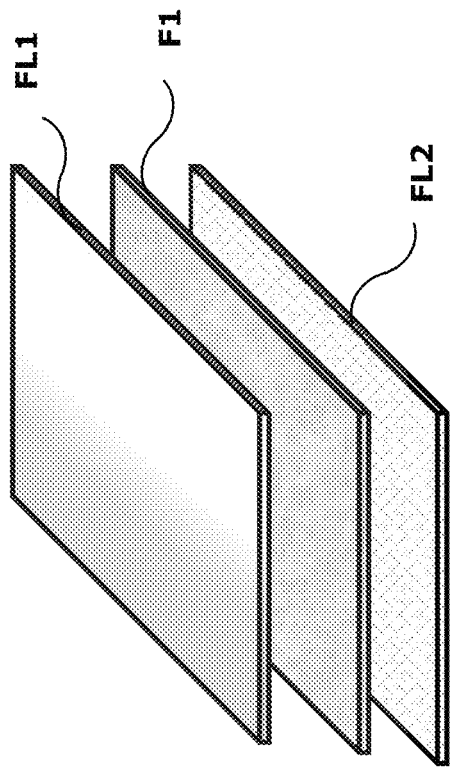
FIG. 3 is a schematic perspective view of an exemplary laminate composed of an intermediate layer of thermoplastic polyurethane and two outer layers of which one translucent and the other one shaded.
Figure 2:
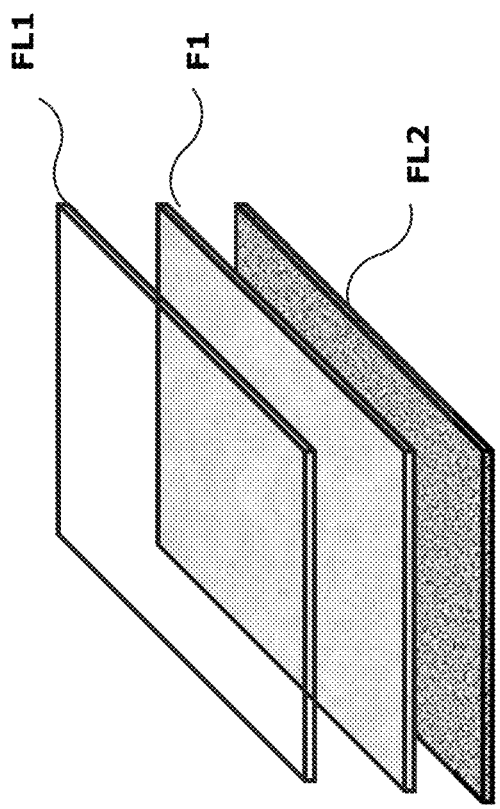
FIG. 2 is a schematic perspective view of an exemplary laminate composed of an intermediate layer of thermoplastic polyurethane and two outer layers of which only one transparent.

The sheets FL1 and FL2 can also have aesthetic features or characteristic multichromatic properties, but this is not essential in the teaching provided herein. As non-limiting examples, in FIG. 2 a laminate is illustrated in which the top sheet FL1 is transparent while the base sheet FL2 is opaque, for example it is homogeneously coloured, while FIG. 3 illustrates a laminate in which the top sheet FL1 is shaded while the base sheet FL2 is translucent with a uniform colour. The shades on the most external sheets FL1 and FL2 may also be obtained by an extrusion process or by inserting a pigment filler or by using a dyeing process (known in the eyeglass sector as "dipping", i.e., an immersion dyeing, which is shaded).

The 'package' consisting of at least three layers FL1, FL2 and F1—and possibly other more outer layers, whether or not including an additional thermoplastic polyurethane interlayer having aesthetic features—is placed, according to a first embodiment, in a plane press where, by means of pressure and heat addition, a laminate of the final thickness from 1050 microns to about 2 cm is obtained.

The lamination heat can also be supplied by other techniques, such as a high-frequency or friction heating process.

In this press process, the temperature is typically lower than the softening temperature of the materials which make up the outer sheets FL1 and FL2, but suitable to lead to softening (without excessive fluidization, as is also explained below) of the intermediate layer of TPU.

The heating, cooling and pressure conditions, as well as the time duration of the various processing cycles, therefore, depend on factors such as:

Type and thickness of the polyurethane layer F1;
Type and thickness of the polymer used for the other layers FL1 and FL2.

The bonding between the various layers of the 'package' mainly depends on the softening temperature of the polyurethane layer F1, which, in addition to the aesthetic function, acts as a binding agent (hot melt adhesive). For this reason, the package must comprise one polyurethane layer F1, which has—as mentioned above—a softening temperature lower than, or equal to, that of the polymers used for the other surrounding layers FL1 and FL2; in this way, the bonding of the laminate is ensured while avoiding the deformation of the individual components. Said softening must be sufficient to obtain a 'package' (FL1, F1, FL2) that is difficult to be delaminated, but avoiding to reach an excessive fluidity that would compromise the stability and consistency of the aesthetic pattern of the polyurethane sheet F1.

The conditions should therefore be selected on the basis of a trade-off on the specific composition chosen.

Usual temperatures with thermoplastic materials are between 40 and 220° C., preferably above 100° C., with pressures of about 1 kg/cm$^2$ to 100 kg/cm$^2$, however, inversely proportional to the process temperature (too high pressure along with high temperatures are to be avoided, in order to not decompose the coherence of the aesthetic patterns), and reduced residence times of about 1 minute to 10 hours.

By way of example, below it is reported an experimental test of a process carried out for forming a package consisting of:

A first top layer FL1 of polyamide (commercial product Trogamid TR90) 2000 microns thick;

An intermediate layer F1 of thermoplastic polyurethane (for example, an aliphatic polyurethane) obtained by block process with a 'damask' aesthetic effect in the thickness of 200 microns;

A second base layer FL2 of polyamide (commercial product Trogamid TR 90) 2000 microns thick.

The base sheet FL2 was obtained by injection moulding of a polyamide, with surfaces clean and free from surface contamination, and was placed horizontally on a plane; on said sheet FL2 a sheet was laid having a thickness of 200 microns of the intermediate layer F1 of thermoplastic polyurethane having aesthetic features and, on top of this, the top sheet FL1 of polyamide with surfaces clean and free from surface contamination.

The 'package' thus obtained was placed between two chrome-plated sheets, within a plane of a press. Thereafter, pressure and heat have been applied, with the following specifications: temperature 130° C., pressure of 5 kg/cm$^2$ for a time of 10 minutes.

The laminated product, once cooled, was cut and milled in the shape of a front frame of eyeglasses by means of conditions known to any eyeglass manufacturer.

The product thus obtained was excellent both in terms of technical performance, and of the aesthetic effect achieved. In particular, while ensuring the usual strength and stiffness performance, it was possible to produce eyeglasses with low thickness and provided with a typical thinness of the profiles, achieving advantageous results in technical (lightness) and aesthetic (new light lines) terms.

The semi-finished product of the invention is not obtained only by a press lamination, as indicated above. In alternative embodiments, it is provided that the lamination is carried out with other types of welding: for example, as indicated above, in certain conditions an ultrasonic or vibration/friction welding can be used.

In certain conditions, an intermediate layer of thermoplastic polyurethane (F1) having a thickness greater than 500 microns is not recommended because it could be a hindrance to subsequent processing, such as polishing. In fact, when the hardness of interlayer of TPU (F1) is lower than the hardness of the other adjacent layers, a mechanical processing on the perimetral edges of the laminate can lead to differentiated wear of the materials, resulting in the formation of an unwanted meniscus in the side surface, which tends to accumulate the processing material (abrasive pastes) and to produce triggering points for possible delaminations of the semi-finished product.

The semi-finished product according to the invention is very effective and fully satisfies the objects stated in the preamble. Through the production of thermoplastic polyurethane sheets featuring in-depth decorations and aesthetic effects (in particular obtainable by a block process), it is possible to have a lamination layer that gives both the desired aesthetic effect and the binder function in a laminate composed of sheets with various polymeric materials, which thus confer the desired technical performance to the semi-finished product.

A further advantage deriving from the selection of an intermediate layer based on thermoplastic polyurethane, concerns the fact that it is unnecessary to provide the use of specific glues and adhesives to bind the laminate layers to each other. This implies the elimination of additional costs, practical difficulties and, above all, does not adversely affect the dimensional stability of the laminate: indeed, the thermoplastic polyurethane has dimensional deformations close to 0%, as well as having a flexibility that allows it to match and to follow the curvatures imposed by the outer sheets FL1 and FL2 in all classic processes in the eyewear sector, including thermoforming processes.

Still, in the case of a laminate obtained with TPU and very high performance polymers, such as Nylon, in the production of eyeglass processes for the definition of the structural cores could been even avoided, so as to simplify the production of the laminated eyewear.

Finally, providing the aesthetic component in an interlayer advantageously protects all the aesthetic effects from any wear or chemical attack belonging to the external environment.

It is however understood that the invention is not limited to the particular embodiments illustrated above, which represent only non-limiting examples of its scope, but that numerous variants are possible, all within the reach of a skilled in the art, without thereby departing from the scope of the invention.

Though the lamination techniques described above are only some of those viable, also other processing modes could be advantageously used, still exploiting the aesthetic qualities and the binding function of the intermediate layer of thermoplastic polyurethane. Furthermore, the lamination can take place not only between rectangular sheets, but also between already semi-finished sheets, for example blanks of eyeglass front frames or temples.

Still, the thermoplastic polyurethane sheet having aesthetic features can also be laminated with other support materials, such as paper, cardboard or thin sheets of wood or other materials.

Finally, as already mentioned above, it is not excluded that the laminating process can produce a semi-finished product in which a thermoplastic polyurethane layer having aesthetic features remains on the outside of the semi-finished product.

The invention claimed is:

1. A manufacturing process of a laminated, polymeric semi-finished product having patterned features, the process comprising:
   providing a cohesion layer, 100-500 micron thick and consisting of thermoplastic polyurethane (TPU), the cohesion layer obtained by any of wet-block and dry block processes, and featuring in-depth patterns;
   providing polymeric sheets, formed of materials having a softening temperature higher than a softening temperature of said cohesion layer, at least one of said polymeric sheets being at least partly transparent or translucent; and laminating the at least one of said polymeric sheets to said cohesion layer, with heat and/or pressure addition suitable to reach a softening of said cohesion layer.

2. The process of claim 1, wherein said polymeric sheets are based on one of the polymeric materials of the group consisting of polyamide (PA), polyurethane (PU), polyethereimides (PEI), cellulose propionate (CP), polyurethane-polyurea, thermosetting polyurethane, polycarbonate (PC), polymethil metacrylate (PMMA), acrylonitryl butadien styrene (ABS), polyethylene (PE), styrene-acrylonitryl (SAN), acrylonitryl-styrene-acrylate (ASA), mixtures of polycarbonate and acrylonitryl butadien styrene (PC/ABS), PVC, polybutylenteraphtalate (PBT), PBT/ASA, and ASA/PC.

3. The process of claim 1, wherein said laminating is carried out at a temperature of between 40 and 220° C., and with pressures from 1 kg/cm² to 100 kg/cm².

4. A layered semi-finished polymeric product, provided with in-depth patterns, comprising:
at least two layers, mutually welded to each other by lamination with heat and/or pressure addition,
wherein a first layer of said at least two layers is a cohesion layer (F1) consisting of thermoplastic polyurethane (TPU) obtained by any of wet-block and dry block processes, and featuring in-depth patterns,
wherein a second layer of said at least two layers is a polymeric sheet,
wherein said cohesion layer has a softening temperature that is lower than a softening temperature of said polymeric sheet, and
wherein said polymeric sheet in contact with the cohesion layer (F1) is at least partly transparent or translucent.

5. The product of claim 4, wherein said polymeric sheet are based on one of the polymeric materials of the group consisting of polyamide, polyurethane, cellulose propionate, polycarbonate, polymethyl metacrylate (PMMA), acrylonitryl butadien styrene (ABS), polyethylene (PE), styrene-acrylonitryl (SAN), acrylonitryl-styren-acrylate (ASA), mixtures of polycarbonate and acrylonitryl butadien styrene (PC/ABS), PVC, polybutylenteraphtalate (PBT), PBT/ASA, and ASA/PC.

6. The process of claim 2, wherein said laminating is carried out at a temperature of between 40 and 220° C., and with pressures from 1 kg/cm² to 100 kg/cm².

7. The process of claim 3, wherein the heat addition occurs at a temperature higher than 100° C.

8. The process of claim 6, wherein the heat addition occurs at a temperature higher than 100° C.

* * * * *